United States Patent
Kwon et al.

(10) Patent No.: US 8,265,629 B2
(45) Date of Patent: Sep. 11, 2012

(54) METHOD FOR PERFORMING A HANDOFF BY A COMP SET

(75) Inventors: Soon Yil Kwon, Anyang-si (KR); Han Byul Seo, Anyang-si (KR); Byeong Geol Cheon, Anyang-si (KR); Byoung Hoon Kim, Anyang-si (KR); Ki Jun Kim, Anyang-si (KR); Hak Seong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/146,617

(22) PCT Filed: Jan. 28, 2010

(86) PCT No.: PCT/KR2010/000504
§ 371 (c)(1),
(2), (4) Date: Jul. 27, 2001

(87) PCT Pub. No.: WO2010/087618
PCT Pub. Date: Aug. 5, 2010

(65) Prior Publication Data
US 2011/0281585 A1    Nov. 17, 2011

Related U.S. Application Data

(60) Provisional application No. 61/148,397, filed on Jan. 30, 2009, provisional application No. 61/159,081, filed on Mar. 10, 2009, provisional application No. 61/163,030, filed on Mar. 24, 2009, provisional application No. 61/165,520, filed on Apr. 1, 2009, provisional application No. 61/165,906, filed on Apr. 2, 2009.

(30) Foreign Application Priority Data

May 25, 2009 (KR) .................. 10-2009-0045446

(51) Int. Cl.
*H04W 36/30* (2009.01)
(52) U.S. Cl. .................................. 455/436; 370/332
(58) Field of Classification Search .................. 455/436, 455/438, 442, 453, 450; 370/332, 331
See application file for complete search history.

(56) References Cited

U.S. PATENT DOCUMENTS

| 2005/0094600 | A1 | 5/2005 | Zhang et al. | |
| 2010/0216475 | A1* | 8/2010 | Hoole | 455/436 |
| 2010/0246534 | A1* | 9/2010 | Vargantwar et al. | 370/332 |

FOREIGN PATENT DOCUMENTS

KR    10-2006-0126421 A    12/2006

OTHER PUBLICATIONS

"Inter-eNB and Intra-eNB Schemes for CoMP in LTE-Advanced," 3GPP TSG RAN WG1#54, Jeju, Korea, Aug. 18-22, 2008, 2 pages.
"LTE-Advanced—Coordinated Multipoint Transmission/Reception," TSG-RAN WB1 #53bis, Warsaw, Poland, Jun. 30-Jul. 4, 2008, 6 pages.
"Uplink COMP Schemes," 3GPP TSG RAN WG1 Meeting #55, Prague, Czech Republic, Nov. 10-14, 2008, 2 pages.

* cited by examiner

*Primary Examiner* — Phuoc Doan
(74) *Attorney, Agent, or Firm* — Birch, Stewart, Kolasch & Birch, LLP

(57) ABSTRACT

Disclosed is a method for performing a handoff in a CoMP cluster. A user equipment measures a signal to interference-plus-noise ratio (SINR) value of each of the CoMP sets constituted by the combination of a plurality of base stations in one CoMP cluster. Then, the user equipment transmits the SINR value of each of the CoMP sets to a serving base station through a pilot strength measurement message (PSMM). Subsequently, the user equipment receives, from the serving base station, a message which instructs a handoff determined through the transmitted signal to interference-plus-noise ratio (SINR) values.

10 Claims, 11 Drawing Sheets

METHOD FOR PERFORMING A HANDOFF BY A COMP SET

This application is the National Phase of PCT/KR2010/000504 filed on Jan. 28, 2010, which claims priority under 35 U.S.C. 119(e) to U.S. Provisional Application Nos. 61/148,397 filed on Jan. 30, 2009, 61/159,081 filed on Mar. 10, 2009, 61/163,030 filed on Mar. 24, 2009, 61/165,520 filed on Apr. 1, 2009, 61/165,906 filed on Apr. 2, 2009 and under 35 U.S.C. 119(a) to Patent Application No. KR 10-2009-0045446 filed in the Republic of Korea on May 25, 2009, all of which are hereby expressly incorporated by reference into the present application.

TECHNICAL FIELD

The present invention relates to a method for performing handoff and, more particularly, a method for performing, at a user equipment (UE), handoff between Coordinate Multi-Point (CoMP) sets within one CoMP cluster.

BACKGROUND ART

In a Coordinate Multi-Point (CoMP) system, two or more base stations (BSs) or cells cooperatively communicate with a user equipment (UE) in order to improve communication performance between a BS (cell or sector) and a UE located in a shadow area. A conventional CoMP scheme may be divided into a Multiple-Input Multiple-Output (MIMO) CoMP-Joint Processing (JP) scheme using data sharing and a CoMP-Coordinated Scheduling/Beamforming (CoMP-CS/CB) scheme.

In the CoMP-JP scheme, a UE may instantaneously and simultaneously receive data from BSs which belong to the same cluster and perform CoMP and combine signals received from the BSs so as to improve reception performance.

In contrast, in the CoMP-CS/CB scheme, a UE may instantaneously receive data from one BS. Scheduling or beamforming is performed such that interference with other BSs within a cluster to which the UE belongs is minimized.

In order to perform CoMP, a CoMP cluster which is a set of BSs which can perform a CoMP operation needs to be preferentially set. A conventional method of constituting a cluster includes a method of constituting and managing a cluster by a BS system or a BS control system and a method of constituting and managing a cluster by a UE.

FIG. 1 is a diagram showing the case where a BS control system constitutes a cluster.

Referring to FIG. 1, first, each UE measures interference between neighboring BSs and the UE, averages the interference during a predetermined period, and transmits the average to the BS control system. The BS control system determines interference between the BSs and the UE using the transmitted information and collects BSs which are expected to have high performance improvement if CoMP is used, thereby constituting a cluster. The number of BSs within one cluster may be changed and different clusters differ in the number of BSs included therein. In FIG. 1, one cluster includes three BSs.

FIG. 2 is a diagram showing the case where a UE constitutes a cluster.

Referring to FIG. 2, a UE 1 and a UE 2 measure interference between neighboring BSs and the respective UEs and average the interference during a predetermined period of time. Each UE determines interference between the BSs and the UE based on the average, and collects BSs which are expected to have high performance improvement if CoMP is used, thereby directly constituting a cluster. Then, each UE exchanges the constituted cluster information with a BS control system. In FIG. 2, it is assumed that one cluster includes three BSs, similarly to FIG. 1. The number of BSs belonging to one cluster may be changed. Different clusters may differ in the number of BSs included therein.

If only a BS control system constitutes a cluster, the BS control system intermittently constitutes a new cluster by applying a variation in data transfer amount of each cluster according to movement of a UE. However, if only the BS control system constitutes and manages all clusters within in the network, there is a limit to the degree of a performance improvement obtained using CoMP.

If only each of UEs (UE 1 and UE 2) constitutes a cluster, each of the UE 1 and UE 2 may transmit information regarding a cluster variation according to movement of each UE to a BS using resources of a specific region. At this time, since respective resource allocation regions of the UEs may overlap with each other, cooperation between the UEs is necessary. If each of the UEs constitutes a cluster, scheduling overhead severely increases.

As a UE moves, handoff may occur. Handoff means that, when a UE moves from a BS (cell or sector) to another BS (cell or sector), a channel between the UE and the existing BS is changed to a channel between the UE and the new BS, in order to maintain communication. Handoff may be broadly divided into a hard handoff scheme for breaking the existing channel and then performing connection to a new BS and a soft handoff scheme for maintaining a channel between two BSs (cells or sectors) using a Code Division Multiple Access (CDMA) scheme.

In general, a UE may classify and manage cell IDs within a system, for handoff, which will now be briefly described. An active set includes cells to which a forward data channel (or a downlink data channel) is allocated, that is, cells which are currently performing communication. A candidate set includes cells which are not included in the active set but have sufficient field strengths. A neighbor set includes peripheral cells which may sufficiently belong to a candidate set and are notified through a neighbor list message. A remaining set includes other cells.

A UE uses thresholds T_ADD, T_DROP, T_COMP and T_TDROP, for classification. T_ADD is a reference value for changing a cell from the neighbor set to the candidate set. T_DROP is a reference point for operating T_TDROP in the active set and T_COMP is a reference value for comparing field strength of a signal received from the active set. T_TDROP is a timer which operates when the field strength of a signal received from a cell becomes equal to or less than the T_DROP value. Hereinafter, a handoff process of a conventional UE will be described.

FIG. 3 is a diagram showing handoff state among a BS 1, a BS 2 and a BS 3.

Referring to FIG. 3, it is assumed that a UE 1 which receives a data channel allocated by the BS 1 and performs data communication with the BS 1 enters a handoff area between the BS 1 and the BS 2. That is, it is assumed that the BS 1 belongs to the active set of the UE 1 and the remaining cells belong to the neighbor set of the UE 1.

If the field strength of a signal received from the BS 2 is greater than the T_ADD value, the UE 1 transmits information about the field strength of a signal received from each BS through a pilot strength measurement message (PSMM) to the BS 1, in order to transfer the BS 2 from the neighbor set to the candidate set. The BS 1 transmits a handoff direction message (HDM) to the UE 1 so as to include the BS2 in the candidate set.

Thereafter, if the field strength of the signal received from the BS 2 is greater than the field strength of the signal received from the cell in the active set by the T_COMP value or more, the UE 1 transmits a PSMM to the BS 1 in order to transfer the BS 2 from the candidate set to the active set, and the BS 1 and the BS 2 transmit an HDM to the UE 1 so as to include the BS 2 in the active set. Then, the active set includes the BS 1 and the BS 2 and the UE 1 may receive data through a combination of data channels of the BS 1 and the BS 2.

Thereafter, if the UE 1 gradually moves toward the BS 2 and thus the field strength of the signal received from the BS 1 becomes less than the T_DROP value, the T_TDROP timer begins to operate, and, if the T_TDROP timer has expired and the field strength of the signal received from the BS 1 is less than the T_DROP value, the BS 1 is transferred from the active set to the neighbor set and handoff from the BS 1 to the BS 2 is completed.

It is assumed that the UE 1 simultaneously receives data from the BS 1 and the BS 2 and moves toward the BS 3. If the field strength of the signal received from the BS 3 is gradually increased and becomes greater than the T_ADD value, the UE 1 transmits a PSMM to the BS 1 and the BS 2 in order to transfer the BS 3 from the neighbor set to the candidate set. The BS 1 and the BS 2 transmit an HDM to the UE 1 so as to include the BS 3 in the candidate set.

Thereafter, if the field strength of the signal received from the BS 3 is greater than that of the active cell by the T_COMP value, the UE 1 transmits a PSMM to the BS and the BS 2 in order to transfer the BS 3 from the candidate set to the active set, and the BS 1 and the BS 2 transmit an HDM to the UE 1 so as to include the BS 3 in the active set. Then, the active set including the BS 1, the BS 2 and the BS 3 and the UE 1 may receive data through a combination of data channels of the BS 1 and the BS 2.

Thereafter, if the UE 1 gradually moves toward the BS 3, only the BS 3 is included in the active set. However, when a resource allocation state of the BS 3 is considered, it may difficult to perform handoff to the BS 3. Since handoff is conventionally determined based only on the pilot strength measurement of each BS, a problem may occur. In the related art, only handoff to one BS is considered.

In addition, a method of selecting an adequate CoMP scheme from among various CoMP schemes according to the current state of a UE is not yet defined.

DISCLOSURE

Technical Problem

An object of the present invention devised to solve the problem lies in a method of performing a handoff in each of CoMP set.

The objects of the present invention are not limited to the above object and other objects which are not described herein will become apparent to those skilled in the art from the following description.

Technical Solution

The object of the present invention can be achieved by providing a method of performing handoff between coordinate multipoint (CoMP) sets, at a user equipment (UE), in a CoMP cluster including a plurality of base stations including measuring a signal to interference plus noise ratio (SINR) value of each of the CoMP sets constituted by the combination of a plurality of base stations within the CoMP cluster, the user equipment transmitting the SINR value of each of the CoMP sets to a first base station, which is a serving base station, through a pilot strength measurement message (PSMM), and the user equipment receiving, from the first base station, a message which instructs handoff based on the transmitted SINR value.

The method may further include simultaneously receiving signals from base stations in a CoMP active point set corresponding to a CoMP set selected from among the CoMP sets by a base station control system.

The method may further include receiving data from a CoMP active point set including a base station in a CoMP set selected from among the CoMP sets by a base station control system.

The SINR value of each of the CoMP sets may be measured while the user equipment operates using a joint processing scheme which can simultaneously receive signals from base stations in each of the CoMP sets.

The SINR value of each of the CoMP sets may be measured while the user equipment operates using a coordinated silencing scheme which eliminates an interference signal from a specific base station among base stations in each of the CoMP sets.

The CoMP cluster may be reconstituted by the user equipment within a CoMP network cluster set constituted by a base station control system.

An another aspect of the present invention, provided herein is a method of supporting handoff between coordinate multipoint (CoMP) sets at a base station control system in a CoMP cluster including a plurality of base stations including a base station control system receiving, from the user equipment, a signal to interference plus noise ratio (SINR) value of each of the CoMP sets constituted by the combination of the plurality of base stations within the CoMP cluster, and the base station control system determining a CoMP active point set based on the resource allocation state of each of the CoMP sets and the SINR value of each of the CoMP sets.

The method may further include the base station control system selecting a CoMP coordinate point set based on a resource allocation state of each of the CoMP sets and the SINR of each of the CoMP sets.

Advantageous Effects

A method of performing handoff within a CoMP cluster according to the present invention has various advantages.

First, if a user equipment supports a CoMP operation, it is possible to more efficiently perform handoff.

Second, it is possible to improve a data rate between a user equipment and a system by constituting an optimal CoMP set.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
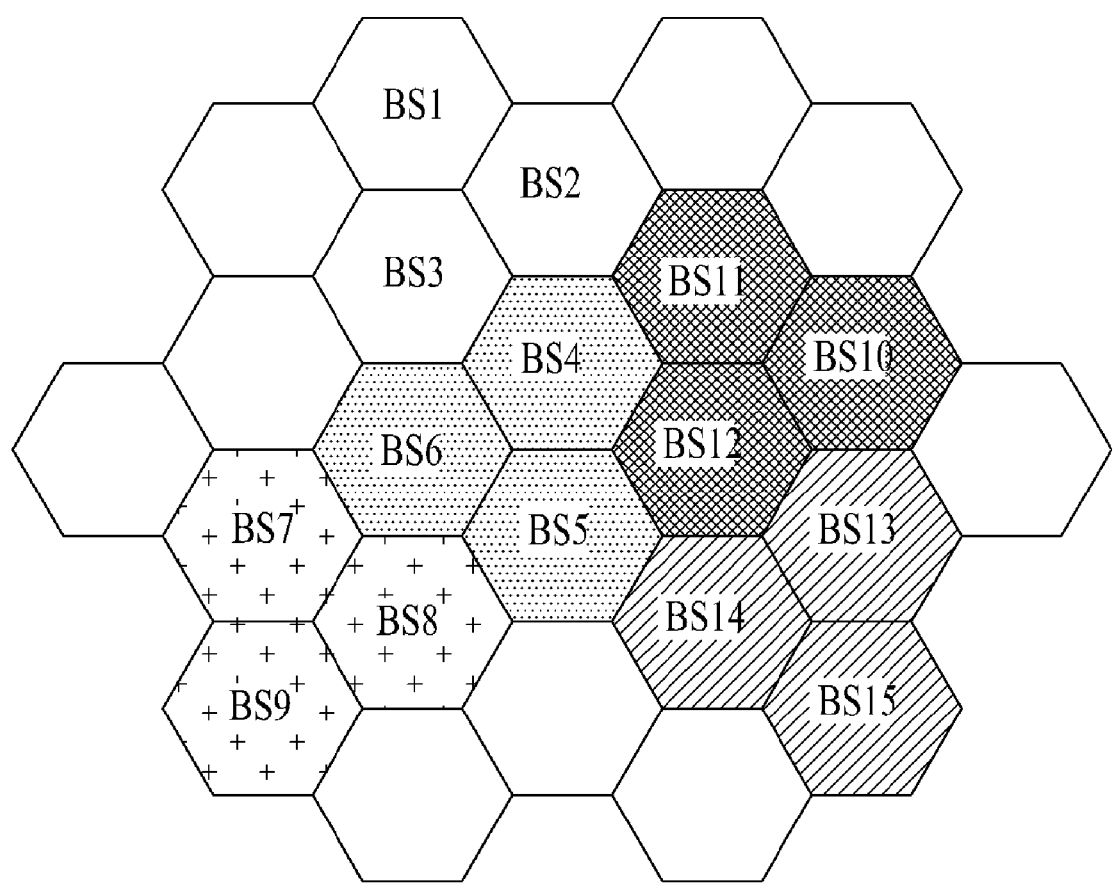
FIG. 1 is a diagram showing the case where a BS control system constitutes a cluster.
Figure 2:
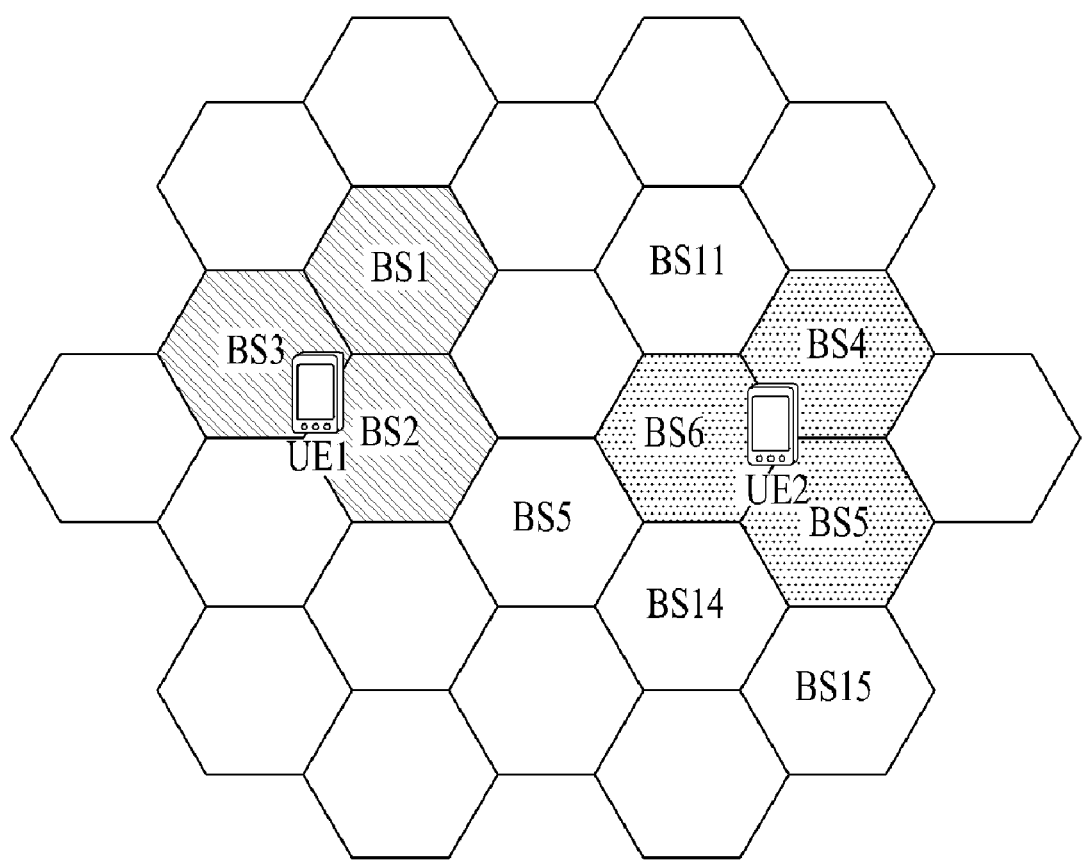
FIG. 2 is a diagram showing the case where a UE constitutes a cluster.
Figure 3:
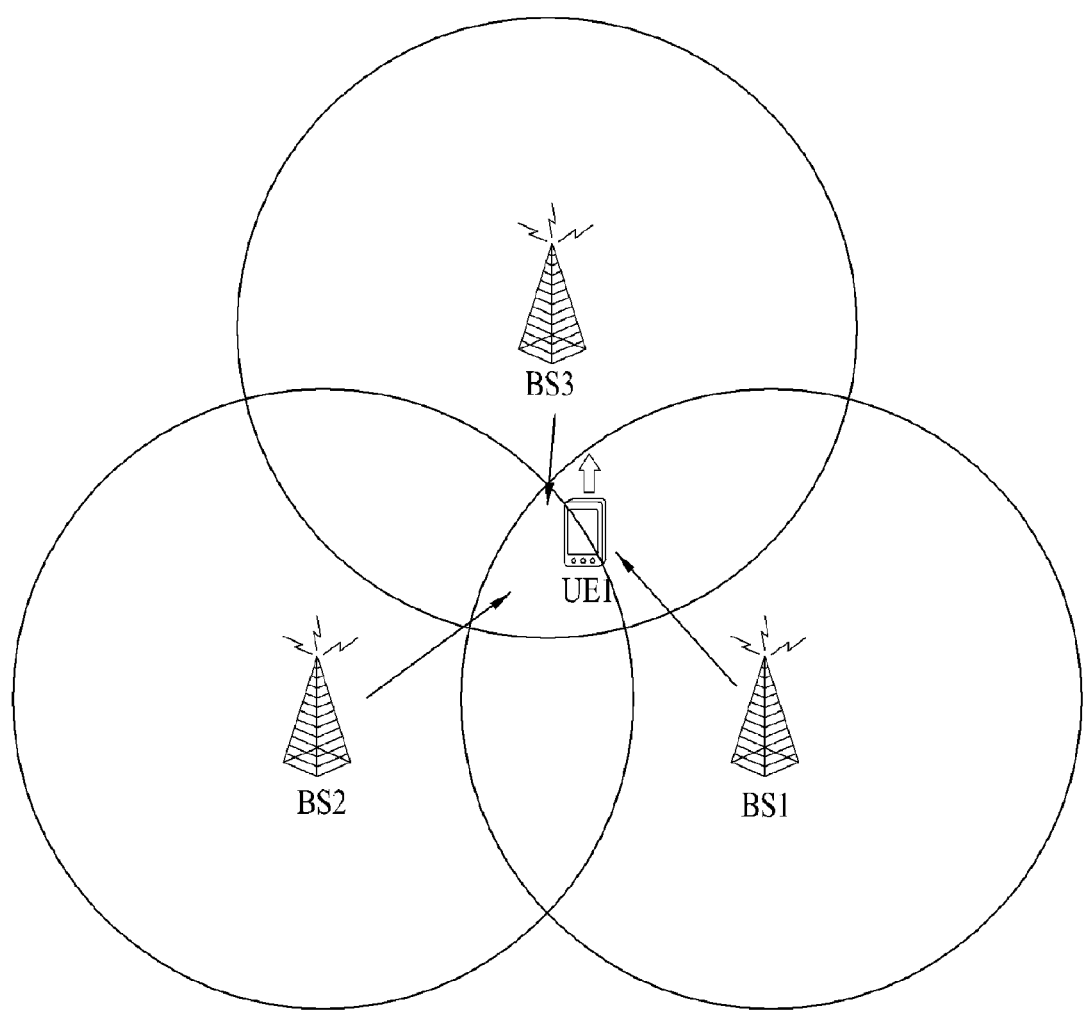
FIG. 3 is a diagram showing a handoff state among a BS 1, a BS 2 and a BS 3.

Hereinafter, the preferred embodiments of the present invention will be described with reference to the accompanying drawings. It is to be understood that the detailed description which will be disclosed with reference to the accompanying drawings is intended to describe exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For example, although certain terms are used in the following description, the terms are not limited to these terms and these terms may be replaced with other terms. The same reference numbers will be used throughout the drawings to refer to the same or like parts.

Throughout the specification, when a certain portion "includes" a certain component, this indicates that other components are not excluded and may be further included unless otherwise noted.

The following techniques may be used in various communication systems and such communication systems may provide various communication services such as packet data. The techniques of the communication system may be used in downlink or uplink. The term "Base Station" may be replaced with the terms fixed station, Node-B, eNode-B (eNB), access point, or ABS as necessary. The term "mobile station (MS)" may also be replaced with the term user equipment (UE), subscriber station (SS), mobile subscriber station (MSS), AMS or mobile terminal as necessary.

A transmitter refers to a node for transmitting a data or voice service and a receiver refers to a node for receiving a data or voice service. Accordingly, in uplink transmission, a terminal becomes a transmitter and a base station becomes a receiver. Similarly, in downlink transmission, a terminal becomes a receiver and a base station becomes a transmitter.

As the mobile terminal of the present invention, a personal digital assistant (PDA), a personal communication service (PCS) phone, a global system for mobile (GSM) phone, a wideband CDMA (WCDMA) phone, or a mobile broadband system (MBS) phone may be used.

The embodiments of the present invention can be supported by the standard documents disclosed in wireless access systems, such as an Institute of Electrical and Electronics Engineers (IEEE) 802 system, a $3^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents. In addition, all the terms disclosed in the present document may be described by the above standard documents. In particular, the embodiments of the present invention may be supported by TS25, TS36 series and C.S000x series which are the standard documents of the 3GPP and 3GPP2 system.

It should be noted that specific terms disclosed in the present invention are proposed for the convenience of description and better understanding of the present invention, and the use of these specific terms may be changed to another format within the technical scope or spirit of the present invention.

In the present invention, a base station (BS) may conceptually include a cell or a sector. In addition, in the present invention, a UE, a BS and a BS control system configure a radio network and are connected through an internal interface, a backbone network, etc.

A BS control system performs a high-level function of a serving BS and a coordinated BS and controls data and control signal transfer. Such a BS control system may be generally referred to as a network entity. A serving BS (cell) may be a BS for providing main services to a UE and may perform transmission and reception of control information on a coordinate multipoint. In this sense, the serving BS may be referred to as an anchor cell.

A Coordinate Multipoint (CoMP) system can improve throughput of an MS located in a boundary between cells by applying improved MIMO transmission in a multi-cell environment. If the CoMP system is applied, it is possible to reduce inter-cell interference in a multi-cell environment and enable an MS to receive data from multi-cell BSs. Since each BS simultaneously supports one or more MSs MS 1, MS 2, . . . , and MS K using the same radio frequency resources, it is possible to improve system performance. The BS may perform Space Division Multiple Access (SDMA) based on channel state information between the BS and the MS.

In the CoMP system, a serving BS and one or more coordinated BSs may be connected to a scheduler through a backbone network. The scheduler may receive channel information of channel states between the MSs MS 1, MS 2, . . . , and MS K and the coordinated BSs measured by the BSs BS 1, BS 2, . . . , BS M through the backbone network so as to operate. For example, the scheduler may schedule information a coordinated MIMO operation with respect to the serving BS and one or more coordinated BSs. That is, the scheduler may directly instruct each BS to perform the coordinated MIMO operation.

In the CoMP system, cells based on the same BS as a specific MS may transmit and receive information (e.g., data, channel state information (CSI), etc.) through an internal interface or an x2 interface. However, cells based on different BSs may transmit and receive information through a backhaul network, etc.

A CoMP scheme refers to a scheme for increasing data throughput of an MS located in a shadow area and total data throughput of a network by cooperation between two or more transmission points. A transmission point may be a base station of a cell, such as a relay or a router, or another transmission antenna point. The actual positions of the transport points may be the same BS (intra-cell site) or different BSs (inter-cell site).

If the transmission points are on an intra-cell site basis, since backhaul delay is significantly less than that of other arrangement of base stations, it is possible to further arrange a coordinated BS (cell site). In order to adequately operate the CoMP system, cells need to be grouped into clusters. If cells are not grouped into clusters, since a network entity executes downlink data scheduling with respect to the whole network, total backhaul overhead may be significantly large. Therefore, the cells need to be adequately grouped into clusters. Hereinafter, a method of constituting a CoMP cluster will be described.

Transmission points located around each MS may be divided into the following 5 categories.

A CoMP Active Point Set (CAPS) is a transmission point set which serves a specific UE and actually performs CoMP transmission, and corresponds to an active set of a conventional cluster. A CoMP Coordinated Point Set (CCPS) is a transmission point set which serves a specific UE and actually performs CoMP coordinated scheduling, and corresponds to a candidate set of the conventional cluster.

A CoMP Report Point Set (CRPS) is a transmission point set in which a specific UE reports a channel state between a transmitter and a receiver to a network through a pilot strength measurement message. A CoMP Measurement Point Set (CMPS) is a transmission point set in which a specific UE measures a channel state between a transmitter and a receiver, such as pilot signal strength, and corresponds to a neighbor set of the conventional cluster. A CoMP Network Clustering Set (CNCS) is a transmission point set which performs data transmission scheduling and indicates a cluster set constituted by a network. The UE may constitute and manage the cluster within the network cluster set.

In a CoMP-CS/CB scheme, a cell set for determining coordinated scheduling for controlling interference generated from other cells includes cells in the CCPS. Since only a serving cell actually transmits data, the size of the CAPS is always 1 in the CoMP-CS/CB scheme.

Conventionally, a CoMP-JP scheme is defined as a scheme for allocating, at each transmission point, a data channel and transmitting data. However, if all transmission points which perform the CoMP-JP scheme transmit data, backhaul data is significantly increased. Thus, a new CoMP-JP is preferably defined.

In the present invention, even when each transmission point does not allocate the data channel and transmit data, if data is available in each transmission point, it may be defined that a CoMP-JP scheme is performed. Accordingly, dynamic cell selection in which data is available in each transmission point and actual transmission may occur in one preferable transport point at a specific time may be defined as a CoMP-JP scheme.

Dynamic cell selection is similar to fast cell selection. If radio resources must be allocated for a handoff and handoff frequently occurs, system load may be increased. In order to overcome such a problem and provide a continuous packet service in a mobile environment, fast cell selection is performed. A fast cell selection algorithm serves to select the best cell in terms of power and code space as well as radio environment from among cells included in the active set so as to provide a service.

In the CoMP-JP scheme, multiple transmission points for transmitting data to a UE are cells of the CAPS. The CAPS includes transmission points for actually transmitting data. Accordingly, in the CoMP-JP scheme, the size of the CAPS is greater than or equal to 1. The CAPS is a subset of the CCPS and the sizes of the CAPS, the CCPS, the CRPS or the CMPS satisfy Equation 1.

$$\text{CAPS} \leq \text{CCPS} \leq \text{CRPS} \leq \text{CMPS} \qquad \text{Equation 1}$$

Here, it is noted that the CAPS, the CCPS, the CRPS and the CMPS are defined for a specific UE. In contrast, the CNCS may be defined by a network.

Figure 4:
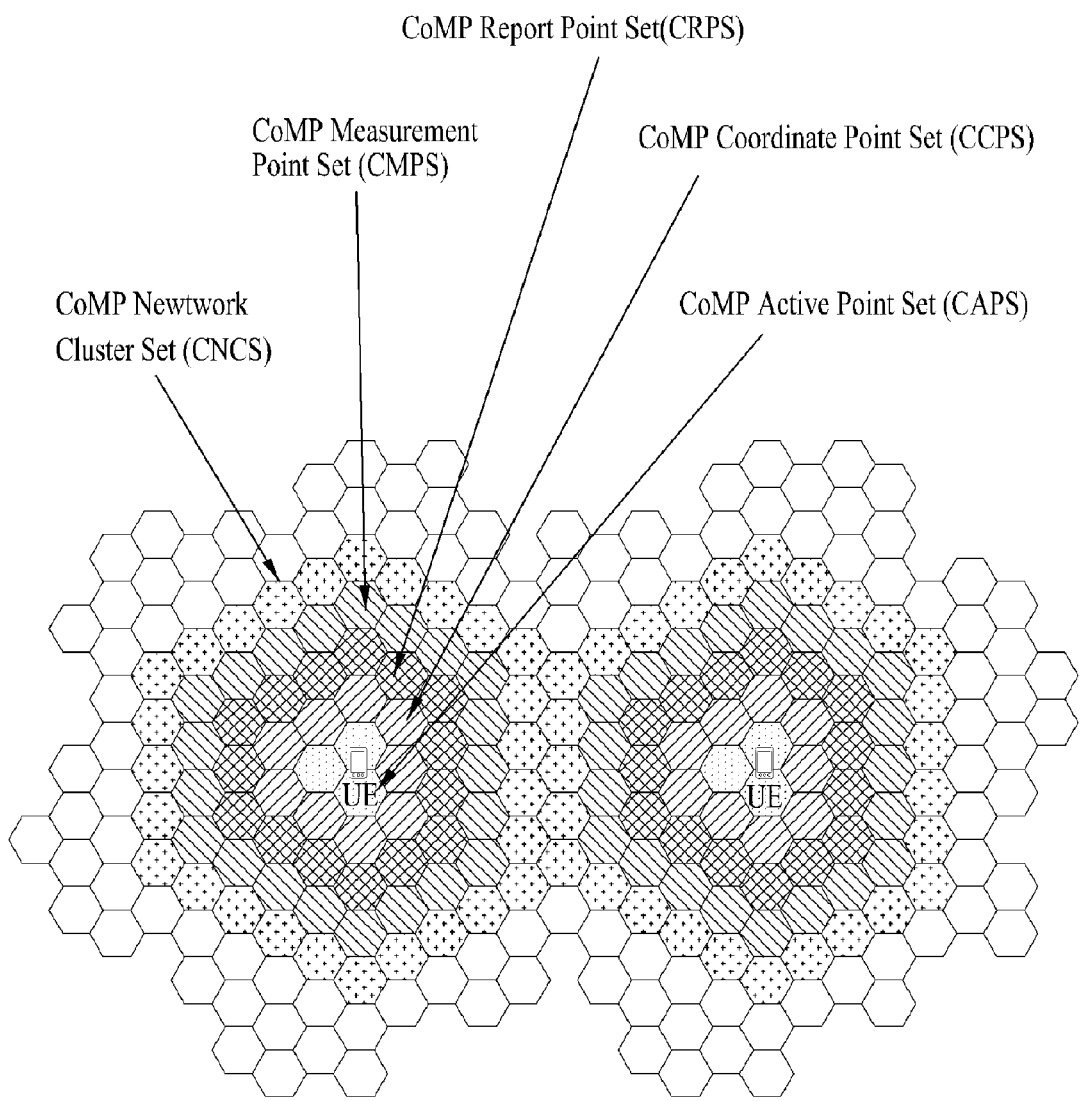
FIG. 4 is a diagram showing an example of CoMP set classification.
Figure 5:
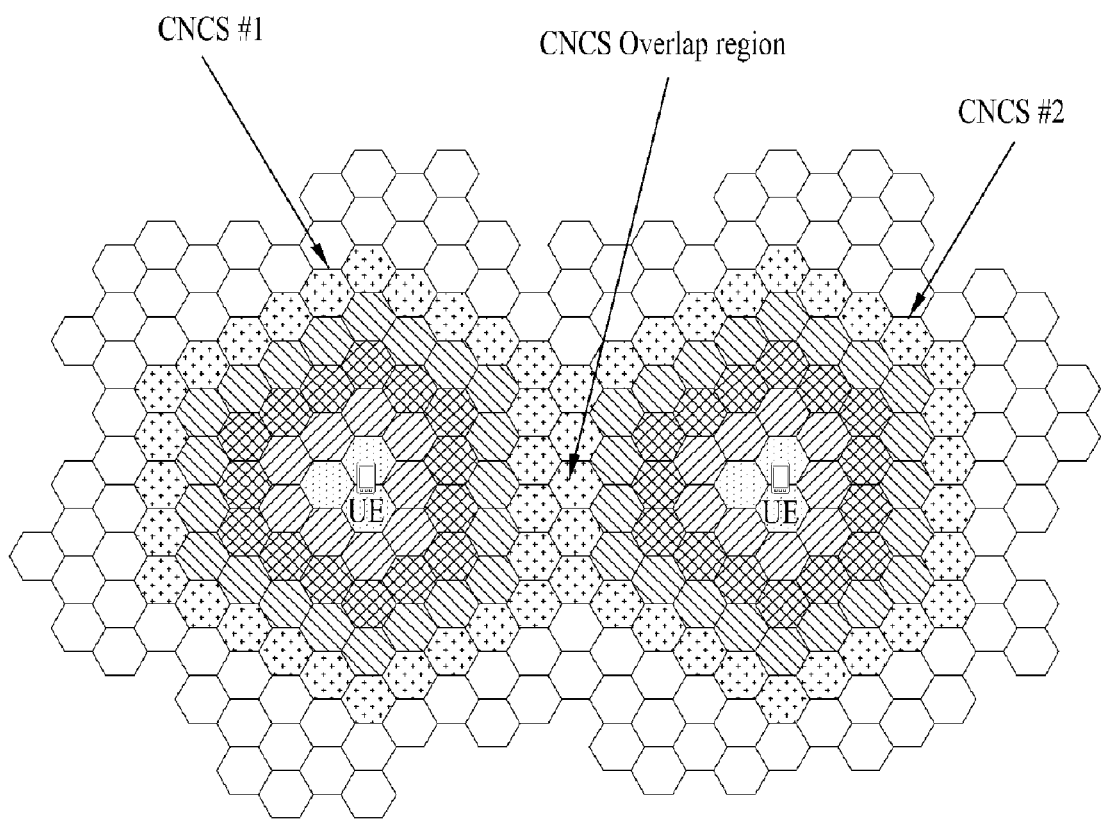
FIG. 5 is a diagram showing an example of CoMP set classification.

FIGS. 4 and 5 are diagrams showing examples of CoMP set classification.

In FIGS. 4 and 5, each transmission point corresponds to a cell and the strength of a signal from each cell may be proportional to a distance between a cell and a UE. It is assumed that cells are divided into two CNCSs and a UE 1 in a network and a UE 2 are respectively located in the CNCSs.

In FIG. 4, it is assumed that two CNCS regions are mutually exclusive. Accordingly, data transmission scheduling may be performed within each CNCS. In the embodiment, for the UE 1 and the UE 2, the size of the CAPS may be 3, the size of the CCPS may be 9, the size of the CRPS may be 15, and the size of the CMPS may be 21.

Alternatively, for the UE 1 and the UE 2, the size of the CAPS may be 3, the size of the CCPS may be 12, the size of the CRPS may be 27, and the size of the CMPS may be 48. In this case, the size of the CoMP point set is represented by a sum of the sizes of subsets of the CoMP point set.

In FIG. 5, a first CNCS region and a second CNCS region are not mutually exclusive and partially overlap. A UE may be located in a boundary region between the first CNCS region and the second CNCS region (that is, a CNCS overlap region). In this state, even when a strong interference signal from another CNCS is present, a CoMP operation may be performed between the first CNCS and the second CNCS.

By allowing the CNCS overlap region, a UE which begins to enter the CNCS overlap region may obtain various gains from the CoMP operation between the first CNCS and the second CNCS. It is noted that resource scheduling cooperation in the CNCS overlap region is performed by a combination of the first CNCS and the second CNCS.

Figure 6:
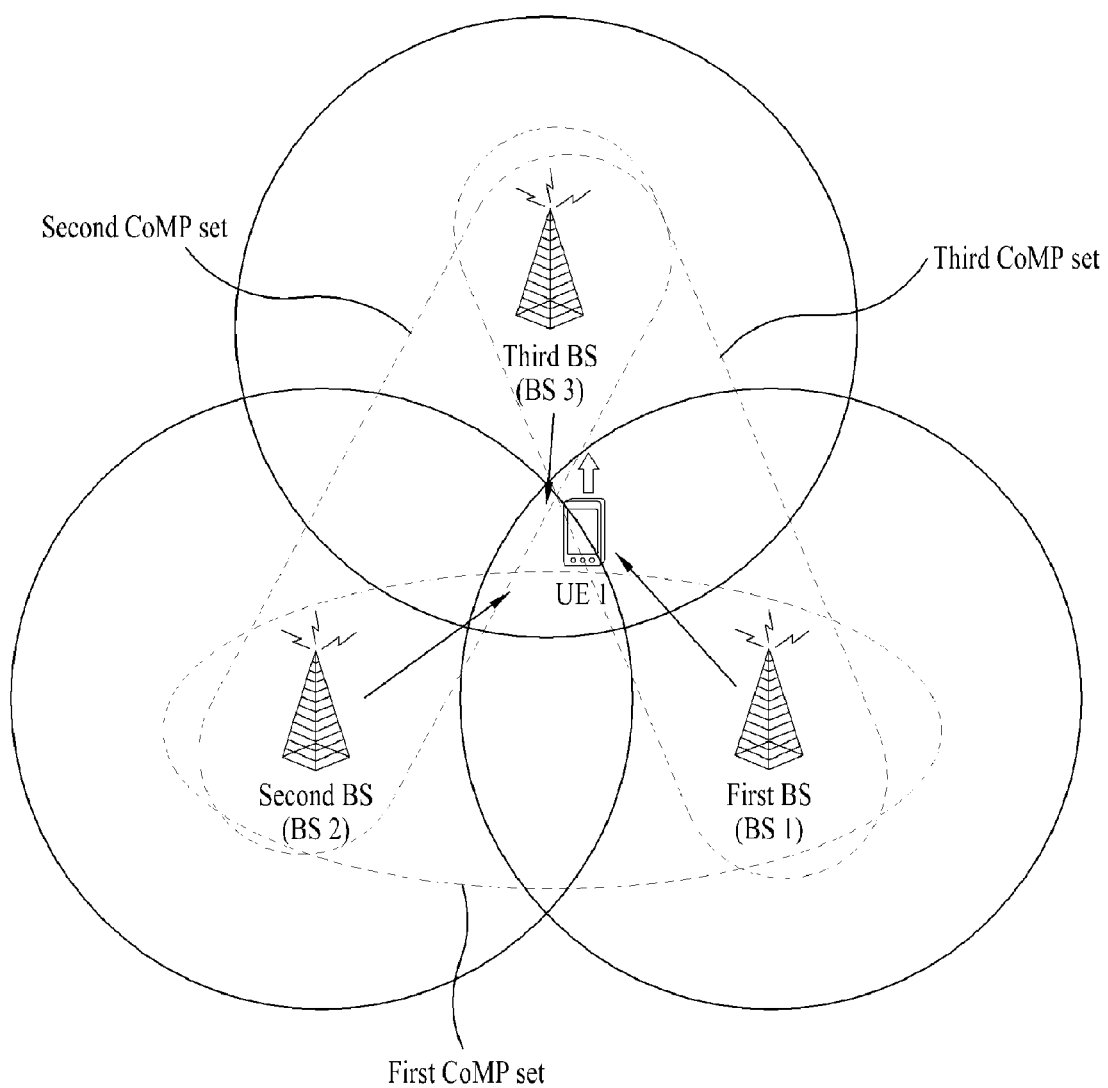
FIG. 6 is a diagram showing a state in which a UE 1 performs handoff among a BS 1, a BS 2 and a BS 3 in each CoMP set.

FIG. 6 is a diagram showing a state in which a UE 1 performs handoff among a BS 1, a BS 2 and a BS 3 in each CoMP set.

Referring to FIG. 6, in the state in which the UE 1 performs handoff among the BS 1, the BS 2 and the BS 3, the UE 1 may simultaneously receive data from the BS 1 and the BS 2. It is assumed that the UE 1 may simultaneously receive a signal from a maximum of two BSs. It is assumed that the BS 1 and the BS 2 constitute a first CoMP set, the BS 2 and the BS 3 constitute a second CoMP set, and the BS 3 and the BS 1 constitute a third CoMP set.

A CAPS for a CoMP-JP scheme and a CCPS for a CoMP-CS/CB scheme may be included. The BS 1, the BS 2 and the BS 3 are all included in a CNCS. It is assumed that the BS is an anchor cell for transmitting a control signal such as an HDM or Channel Assignment Message (CAM) to the UE 1.

If the UE 1 gradually moves toward the BS 3, the field strength of the signal received from the BS 3 is gradually increased. If the field strength of the signal received from the BS 3 becomes greater than the T_ADD value, the UE 1 may transmit a pilot strength measurement message (PSMM) to the BS 1 and the BS 2. At this time, when the UE transmits the PSMM using a conventional handoff scheme without determining whether or not CoMP between BSs is performed, a BS control system may not have sufficient information used to determine whether or not CoMP between BSs is performed in consideration of a resource allocation state.

For example, if it is difficult to perform CoMP with the BS 1 or the BS 2 given current resource allocation of the BS 3, the UE 1 may preferably maintain the first CoMP set of the BS 1 and the BS 2 instead of performing handoff to the BS 3. If handoff is performed using the conventional method, the UE 1 compares the field strengths of the signals received from the BS 1, the BS 2 and the BS 3 so as to perform handoff to the BS 3. Accordingly, there is a need for an improved handoff scheme for constituting an optimal CoMP set for solving such problem which occurs when the UE 1 performs handoff to the BS 3. Hereinafter, an improved handoff scheme will be described.

The UE may not know the CoMP scheme which will be performed between the BS 3 and the BS 1 (or the BS 2, only the BS 1 is considered hereinafter). Accordingly, the UE 1 may assume the CoMP scheme which will be performed between the BS 3 and the BS 1 and transmit information regarding the CoMP scheme to the BS 3. The UE 1 may instantaneously and simultaneously receive data signals from the BS 1 and the BS 2 included in the first CoMP set. When the UE 1 performs handoff while gradually moving toward the BS 3, the UE 1 may instantaneously compare the field strengths of the signals received from the BS 1 and the BS 3 included in a third CoMP set with the T_ADD value. The CoMP schemes performed by the UE 1 and the third CoMP set (BS 1 and BS 2) will be described.

1. CoMP-JP (1) Case where BS 1 and BS 3 Perform CoMP-JP

The UE 1 may predict the field strength of the received signal after the third CoMP set (BS 1 and BS 3) performs CoMP-JP on the assumption that the third CoMP set (BS 1 and BS 3) performs CoMP-JP. Prediction of the field strength of the received signal after CoMP-JP may be changed according to a selected specific CoMP-JP scheme.

A value predicted when the third CoMP set (BS 1 and BS 3) transmits the same data signal may be a sum of the field strengths of the signals received from the third CoMP set (BS 1 and BS 2). The UE 1 compares the predicted value with the T_ADD value and transmits information indicating that the predicted value is greater than the threshold to the BS 1 through a PSMM if the predicted value is greater than the threshold.

The PSMM may include the field strength information of the signals received from the BS 1, BS 2 and BS3 and the field strength information of the signals received from the first CoMP set (BS 1 and BS 2), the second CoMP set (BS 2 and BS 3) and the third CoMP set (BS 3 and BS 1). The PSMM may be replaced with reference signal received power (RSRP) or reference signal received quality (RSRQ).

In a Long Term Evolution (LTE) system, a UE may measure a channel quality state between the UE and a cell using RSRP corresponding to power of a pilot signal.

RSRP refers to a linear average of power distributed to resource elements, to which cell-specific reference signals are allocated, within a measurement frequency bandwidth. Power of each resource element in a resource block may be determined from energy received in a valid period of a symbol excluding a cyclic prefix (CP). RSRP may be applied to a UE in both a radio resource control_idle (RRC_idle) state and RRC_connected state. If a user uses receiver diversity, a reported value may be equal to a linear average of power values of all diversity branches.

An RRC_idle state refers to a state in which a UE checks system information and paging information in a low power consumption state and then sleeps. An RRC_connected state refers to a state in which a UE performs telephone communication or data communication. In general, in the case where a communication channel with the existing cell is broken and a communication channel with another cell is established in an RRC_connected state, it indicates handover and, in the case where a communication channel with the existing cell is broken and a communication channel with another cell is established in a RRC_idle state, it indicates cell reselection.

A UE may measure RSRP by accumulating pilot signals transmitted from cells for a specific time within a predetermined bandwidth. A UE may transmit field strength information using RSRP and transmit signal to interference plus noise ratio (SINR) information using RSRQ.

The BS control system which receives the PSMM from the UE may determine whether or not data is transmitted to the UE through a pair of the BS 1 and BS 3, that is, whether or not the pair of BS 1 and BS 3 is included in an active set of the UE 1, in consideration of resource allocation.

(2) Case where the BS 1 and BS 3 do not Perform CoMP-JP

In this case, the UE 1 performs handoff to the BS 3 using a conventional scheme and may transmit a PSMM to the BS control system if the field strength of the signal received from the BS 3 is greater than the T_ADD value. The PSMM includes field strength information of the signals received from the BS 1, the BS 2 and the BS 3 and the BS control system which receives the PSMM may determine whether or not a signal is transmitted through the BS 3, that is, whether or not the third CoMP set including the BS 1 and BS 3 is included in the active set of the UE 1.

As described above, the UE 1 may perform a process of calculating the field strength information of the signals of the first to third CoMP sets and a process of additionally transmitting the calculated result to the BS control system on the assumption that CoMP-JP is performed. A determination as to whether or not the pair of BS 2 and BS 3 of the second CoMP set is included in the active set may be made through the same process in the above description.

2. CoMP-CS/CB

The BS 1, BS 2 and BS 3 establish one CoMP-CS/CB cluster and the UE 1 may instantaneously receive a data signal from the BS 1 or BS 2. At this time, handoff performed while the UE 1 gradually moves toward the BS 3 will be described in the case where the UE 1 performs CoMP-CS/CB between the BS 1 and BS 3 and the case where the UE 1 does not perform CoMP-CS/CB between the BS 1 and BS 3.

(1) Case where the BS 1 and BS 3 Perform CoMP-CS/CB

The UE 1 may predict the field strength of the received signal after the third CoMP performs CoMP-CS/CB on the assumption that the third CoMP set (BS 1 and BS 3) performs CoMP-CS/CB. Prediction of the field strength of the received signal after CoMP-CS/CB may be changed according to the selected CoMP-JP scheme.

A silencing CoMP-CS/CB scheme may be used. For example, in the case of silencing the BS 3, the predicted value of the field strength of the received signal may be represented by a signal to interference plus noise ratio (SINR). On the assumption that an interference signal from the BS 3 is not present, the SINR may be calculated by subtracting interference from the received signal from the BS 3.

The UE 1 compares the predicted value with the T_ADD value and transmits information indicating that the predicted value is greater than the threshold to the BS 1 through a PSMM if the predicted value is greater than the threshold. The PSMM may include the field strengths of the signals received from the BS 1, BS 2 and BS3 and the field strength information of the first to third CoMP sets. The BS control system which receives the PSMM from the UE may determine whether or not data is transmitted to the UE through the third CoMP (BS 1 and BS 3), that is, whether or not the third CoMP is included in a candidate set of the UE 1, in consideration of resource allocation.

The BS control system may select a BS (that is, an active set) which will actually transmit a signal to the UE from the candidate set if the candidate set is set. Therefore, in case of CoMP-CS/CB, the size of the active set is always 1 and the BS control system may manage the candidate set by aid of the UE.

(2) Case where BS 1 and BS 3 do not Perform CoMP-CS/CB

The UE 1 performs handoff to the BS 3 using a conventional scheme and may transmit a PSMM to the BS control system if the field strength of the signal received from the BS 3 is greater than the T_ADD value. The PSMM includes field strength information of the signals received from the BS 1, the BS 2 and the BS 3 and the BS control system which receives the PSMM may determine whether or not a signal is transmitted through the BS 3, that is, whether or not the third CoMP set (BS 1 and BS 3) is included in the candidate set of the UE 1. If the candidate set is set, the BS control system may select a BS of the active set which will actually transmit a signal to the UE 1.

Therefore, as compared to the conventional scheme, there is a need for a process of calculating the field strength information of the signals of the first to third CoMP sets and a process of transmitting the calculated result to the BS control system on the assumption that CoMP-CS/CB is performed.

A determination as to whether the second CoMP set (BS 2 and BS 3) is included in the candidate set may be made through the same process as the above description and thus a description thereof will be omitted.

As described above, in the case where a BS, which is newly considered upon handoff of a UE, performs CoMP-JP (or CoMP-CS/CB) with a BS belonging to the existing CoMP set and vice versa, the field strength information of a received signal of each BS is transmitted through a PSMM such that the BS control system newly constitutes a CoMP set.

Field strength information and SINR of received signal between a pair of BSs according to each CoMP scheme may be calculated by a UE, a BS or a separate device.

A network entity may not adequately determine which CoMP set is used by using only RSRP or RSRQ. Therefore, it is possible to calculate and measure the SINR of a combination of signals received from cells and to provide the information regarding the SINR. This information is preferably reported to each cell again.

Table 1 shows feedback information of a UE which performs CoMP.

TABLE 1

| | |
|---|---|
| SINR 1 | SINR_CS 12 |
| SINR 2 | SINR_CS 13 |
| SINR 3 | SINR_CS 21 |
| SINR_JP 12 | SINR_CS 23 |
| SINR_JP 13 | SINR_CS 31 |
| SINR_JP 23 | SINR_CS 32 |

Referring to Table 1, SINR N denotes an SINR from a BS N (N=1, 2, 3). SINR_JP NM denotes an SINR of a combination of signals from a BS N and a BS M on the assumption that the BS N and the BS M are included in a CoMP-JP set (where, N=1, 2, 3 and M=1, 2, 3). SINR_CS NM denotes an SINR of a combination of signals from a BS N and a BS M on the assumption that the BS N and the BS M are included in a CoMP-CS/CB set (where, N=1, 2, 3 and M=1, 2, 3). For example, if a silencing scheme is applied in the CoMP CS/CB scheme, SINR_CS 12 may represent a value in the case of eliminating interference from the signal received from the BS 3 when a serving BS is 1.

The amount of information regarding an SINR necessary for a set for performing CoMP-CS/CB is greater than the amount of information regarding an SINR necessary for a set for performing CoMP-JP. This is because SINR_JP NM is equal to SINR_JP MN, but SINR-CS NM is not always equal to SINR_CS MN. SINR_JP NM and SINR_CS NM may be approximately calculated using Equations 2 and 3.

$$\text{SINR\_JP} NM = \text{SINR} N + \text{SINR} M - \alpha \qquad \text{Equation 2}$$

$$\text{SINR\_CS} NM = SN/|IN-SM|-\beta \qquad \text{Equation 3}$$

where, SN denotes the strength of a reference signal received from a cell N and SM denotes the strength of a reference signal received from a cell M. IN denotes an interference and noise coefficient of a UE 1. $\|$ is a symbol representing an absolute value and $|IN-SM|$ denotes an absolute value of a difference between the interference and noise coefficient and the strength of the reference signal received from the cell N. In addition, $\alpha$ denotes a JP compensation coefficient and is equal to or greater than 0. $\beta$ denotes a CS compensation coefficient and is equal to or greater than 0.

The UE 1 may not know which CoMP scheme is currently being performed by the third CoMP set (BS 1 and BS 3) or the second CoMP set (BS 2 and BS 3). In this case, the UE may transmit all the feedback information shown in Table 1 to the BS 1, in order to cover all CoMP schemes.

However, if the UE 1 knows that the third CoMP set (BS 1 and BS 3) performs the CoMP-JP scheme, the UE 1 may transmit feedback information SINR 1, SINR 2, SINR 3, SRNR_JP 12, SINR_JP 13 and SINR_JP 23 in Table 1 to the BS 1.

In contrast, if the UE 1 knows that the third CoMP set (BS 1 and BS 3) performs the CoMP-CS/CB scheme, the UE 1 may transmit feedback information SINR 1, SINR 2, SINR 3, SINR_CS 12, SINR_CS 13, SINR_CS 23, SINR_CS 31 and SINR_CS 32 in Table 1 to the BS 1.

In case of the CoMP-JP scheme, if the UE 1 receives the same data from the BS 1 and BS 3 constituting the third CoMP set, since SINR is a sum of the SINRs of the two signals, it is possible to calculate an SINR using only reference signal reception power. In contrast, if the UE 1 receives different data from the BS 1 and BS 3, SINR may not be calculated by the sum of the SINRs of the two signals.

Up to now, a process of performing, at a UE, a handoff in a state in which three BSs constitute a cluster is described. However, the number of BSs constituting the cluster is not limited to 3. The above-described principle may be applied to the case where three or more BSs constitute a cluster.

In summary, in the present invention, if a UE supports a CoMP operation, it is possible to more efficiently perform handoff. By constituting an optimal CoMP set, it is possible to improve a data rate of a UE and BS control system.

<Adaptive Selection Method of Comp Scheme>

As described above, a CoMP scheme may be largely divided into a CoMP-JP scheme and a CoMP-CS/CB scheme. In a process of selecting an adaptive CoMP scheme at a UE, a CoMP-CS/CB scheme may be divided into two schemes: a CoMP beamforming scheme and a CoMP silencing scheme.

Figure 7:
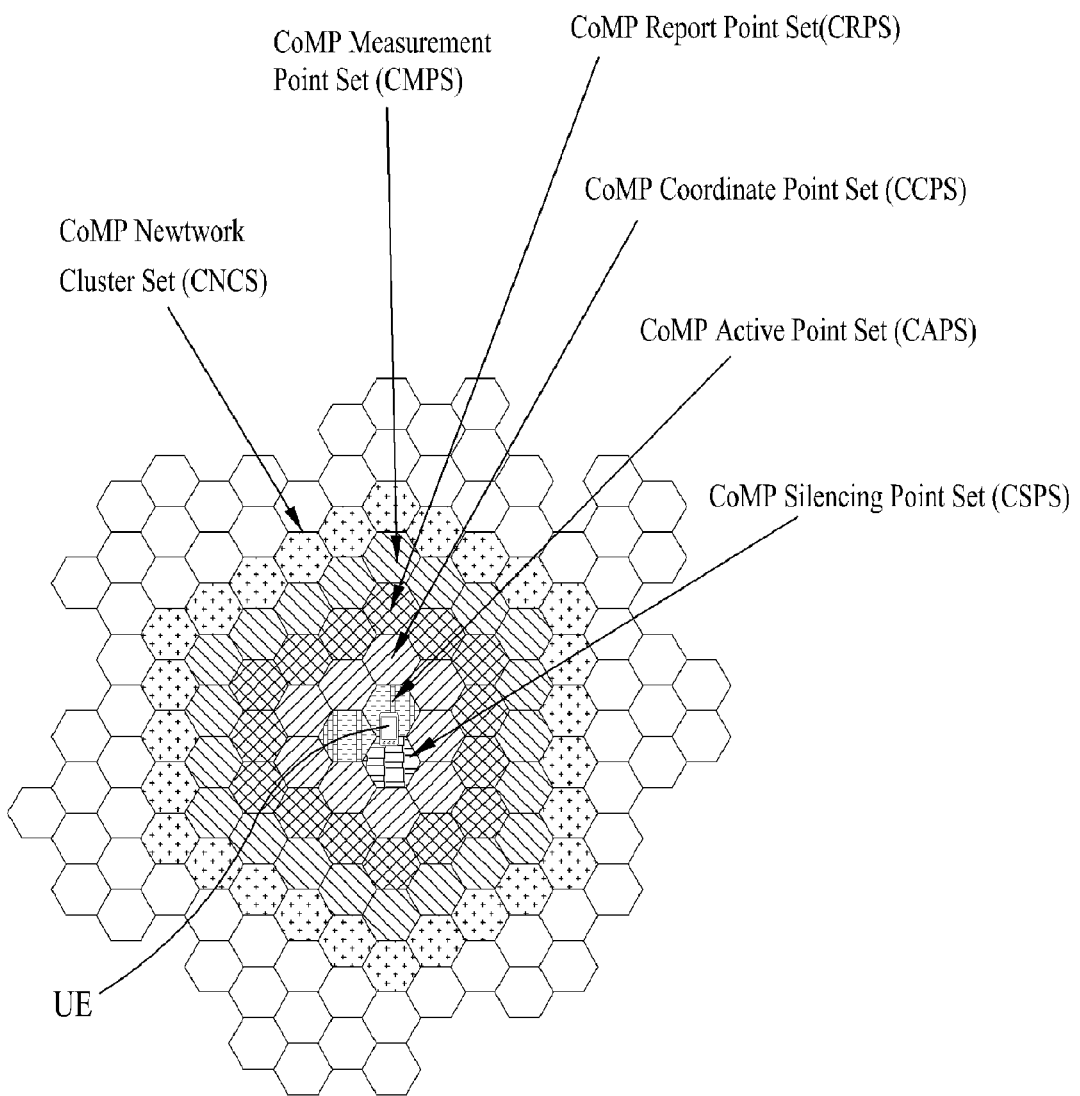
FIG. 7 is a diagram showing an example of CoMP classification.

FIG. 7 is a diagram showing an example of CoMP set classification.

Referring to FIG. 7, one CoMP set may be added to the five CoMP sets defined in FIGS. 4 and 5. The added CoMP set is a CoMP coordinated silencing point set and is defined to support adaptive selection of the CoMP scheme. The CoMP coordinated silencing point set is a set of transmission points for serving a specific UE by performing CoMP coordinated silencing.

Coordinated silencing means that a neighbor transmission point (CoMP silencing point set; CSPS) does not transmit a signal to a target UE during a specific time and a frequency separation in order to reduce interference. An example of selecting a neighbor transmission point (CSPS) is shown in FIG. 5.

Referring to FIG. 7, two cells to be used as a CCPS are selected as a current neighbor transmission point (CSPS) and the two cells may not transmit a data signal to the UE 1 during a predetermined time interval in order to reduce interference.

A network scheduler may select one CoMP scheme from a predefined set of candidate CoMP schemes and apply the selected CoMP scheme to all UEs which can operate within the range thereof. However, an adequate CoMP scheme preferably satisfies a minimum data rate requirement which differs between UEs and multiple CoMP schemes which will be used in a single network need to be allowed.

Figure 8:
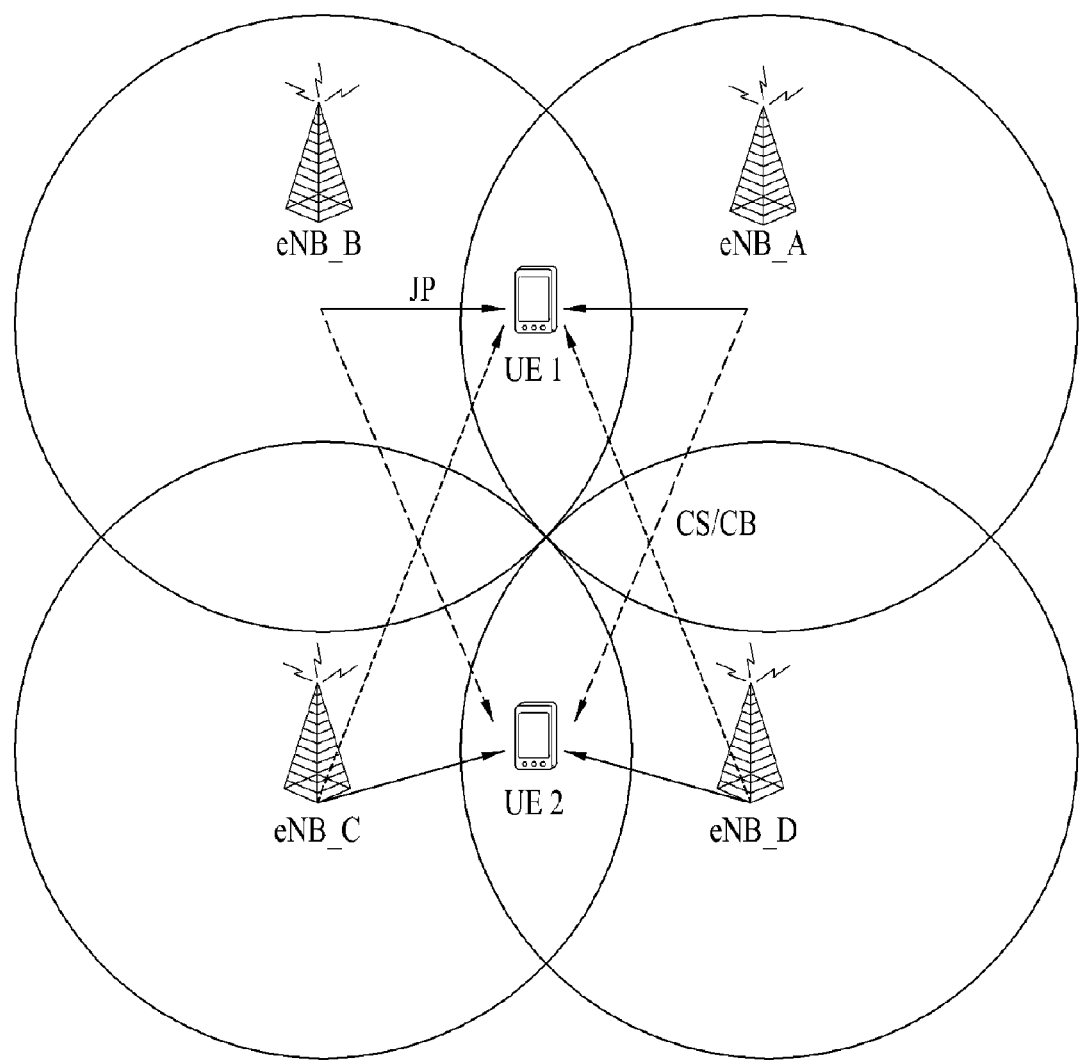
FIG. 8 is a diagram showing an example of multiple CoMP schemes used in a single network.

FIG. 8 is a diagram showing an example of multiple CoMP schemes used in a single network.

Referring to FIG. 8, a pair of BSs (BS A and BS B) may serve a UE 1 using a CoMP-JP scheme and another pair of BSs (BS C and BS D) may serve a UE 2 using a CoMP-JP scheme. Simultaneously, the BS serving the UE 2 may serve the UE 1 using a CoMP beamforming scheme and the BS serving the UE 1 may serve the UE 2 using a CoMP beamforming scheme.

In the present invention, on the assumption that multiple CoMP schemes are allowed, an adaptive CoMP scheme selection method including a plurality of selection steps for satisfying a minimum data rate requirement of each UE is provided.

If a CoMP scheme which will be used by a UE is selected, a minimum data rate requirement of a target UE is preferably considered. A data rate of a UE may depend on factors such as a downlink (or forward link) channel state and a CoMP scheme selected by a network.

For example, when a UE moves toward a boundary region of a cell having a downlink channel state inferior to that of a central region of the cell, a method for satisfying a minimum data rate requirement of 9.6 Kbps uses a CoMP scheme. For example, it is assumed that a CoMP-CS/CB scheme is selected. When a UE gradually moves toward the boundary region of the cell, a downlink channel state further deteriorates and thus a minimum data rate requirement may not be satisfied even using the CoMP-CS/CB scheme.

In order to solve this problem, several BSs within a CCPS performing CoMP CS/CB are silenced. By silencing a neighbor BS so as to further reduce interference from the cell, it is possible to efficiently increase a data rate and SINR of a UE.

It is assumed that a network supports multiple CoMP schemes. At this time, CoMP schemes supported by the network need to be defined first. For example, if the network supports CoMP schemes such as a coordinate-beamforming scheme, a coordinate-silencing scheme and a CoMP-JP scheme, the order of CoMP schemes may be defined as follows such that interference is gradually decreased and n SINR is gradually increased in the arrangement order of CoMP schemes.

Order of Comp Schemes={Coordinate-Beamforming Scheme, Coordinate-Silencing Scheme, CoMP-JP Scheme}

Hereinafter, a method of selecting an adaptive CoMP scheme of a UE based on the order of CoMP schemes will be described.

If a UE does not satisfy a minimum data rate requirement, the UE may select a first CoMP scheme from the predefined order of CoMP schemes. In this case, the first CoMP scheme is a coordinate-beamforming scheme. If SINR is further reduced while the UE performs the coordinate-beamforming scheme, the UE may not satisfy the minimum data rate requirement again. Then, the UE may select and use a next CoMP scheme in the predetermined order of CoMP schemes. The next CoMP scheme may be a coordinate-silencing scheme. In selection of a cell to be silenced, a cell which may cause significantly high interference and increase SINR with respect to a target UE is preferably selected.

If the SINR is further reduced while the UE performs the coordinate-beamforming scheme and the coordinate-silencing scheme, the UE may not satisfy the minimum data rate requirement again. Then, the UE may select and use a next CoMP scheme in the predetermined order of CoMP schemes. The next CoMP scheme may be a CoMP-JP scheme.

In selection of cells by which the CoMP-JP scheme is performed, a cell which can maximize an SINR of a target UE is preferably selected. If the UE cannot satisfy the minimum data rate requirement using the CoMP-JP scheme, a link is preferably dropped.

Figure 9:
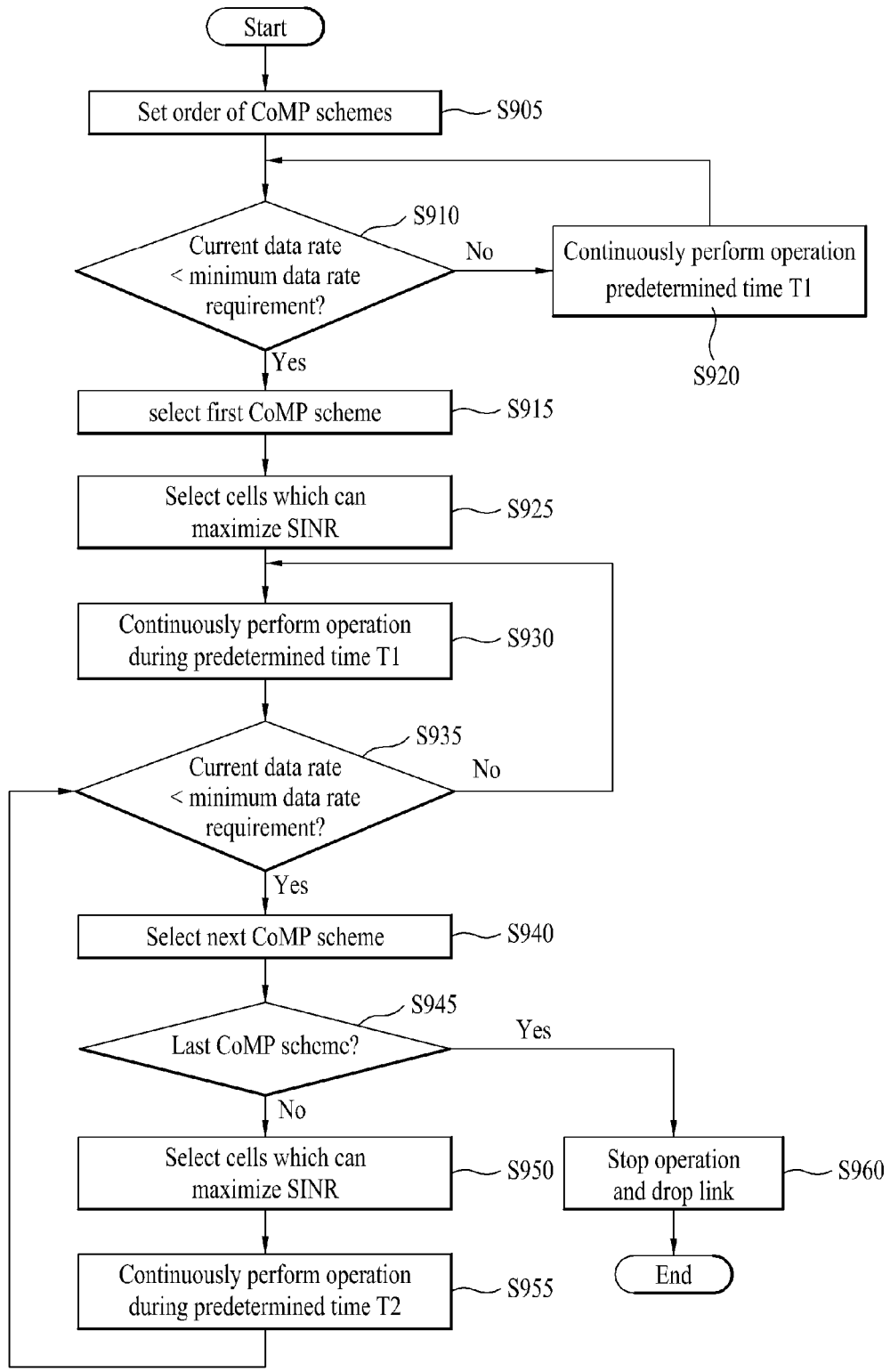
FIG. 9 is a diagram showing an example of a process of selecting a CoMP scheme by a UE.

FIG. 9 is a diagram showing an example of a process of selecting a CoMP scheme at a UE.

Referring to FIG. 9, first, the order of CoMP schemes to be selected by the UE may be set according to a predefined rule (S905). If the current data rate of the UE is less than a minimum data rate requirement (S910), the UE selects a first CoMP scheme according to the predefined order of CoMP schemes (S915) and, otherwise, an operation is continuously performed during a predetermined time T1 (S920).

Thereafter, the UE may select cells which can maximize SINR (S925). The operation can be performed using the selected CoMP scheme during the predetermined time T1 (S930). Thereafter, the data rate of the UE is compared with the minimum data rate requirement and the operation is continuously performed using the selected first CoMP scheme during the predetermined time if the data rate of the UE is greater than the minimum data rate requirement. In contrast, if the current data rate of the UE is less than the minimum data rate requirement (S935), the UE may select a second CoMP scheme (S940).

If the second CoMP scheme is not the last CoMP scheme (S945), the UE may select cells which can maximize SINR (S950). Then, the UE may continuously perform the operation using the second CoMP scheme during a predetermined time T2 (S955). In contrast, if the second CoMP scheme is a last CoMP scheme, the UE may stop the operation using the second CoMP scheme and drop a link (S960). At this time, the link dropped by the UE may be a downlink (which may be referred to as a forward link).

In a process of selecting a silencing cell (CSPS), if the number of specific cells to be silenced is extremely large, the throughput of the cells may be significantly less than those of other cells in a network. The throughputs of the cells may not be equal and thus the throughputs of the UEs may not be equal.

In order to solve this problem, the UE may select cells to be silenced using a round robin scheme. That is, cells in the CCPS are sequentially selected one by one. A predetermined number of cells is selected during a specific time.

As another method, a method of checking the total throughputs of the cells and silencing a cell having the highest total throughput may be used. Using this method, a cell which transmits the largest amount of data to a UE within a cell range is silenced first. If the cell is silenced, a selection indicator is increased one by one and indicates that this cell is selected for silencing. Accordingly, upon next selection, a cell having the largest selection indicator value may be excluded from selection of the cell to be silenced.

Hereinafter, a method of acquiring, at a network entity, information necessary to select a CoMP scheme will be described.

The network entity may directly determine whether each UE satisfies a given minimum data rate requirement using data transmitted to each UE in the past or acquire additional information from each UE and determine whether each UE satisfies a given minimum data rate requirement.

Figure 10:
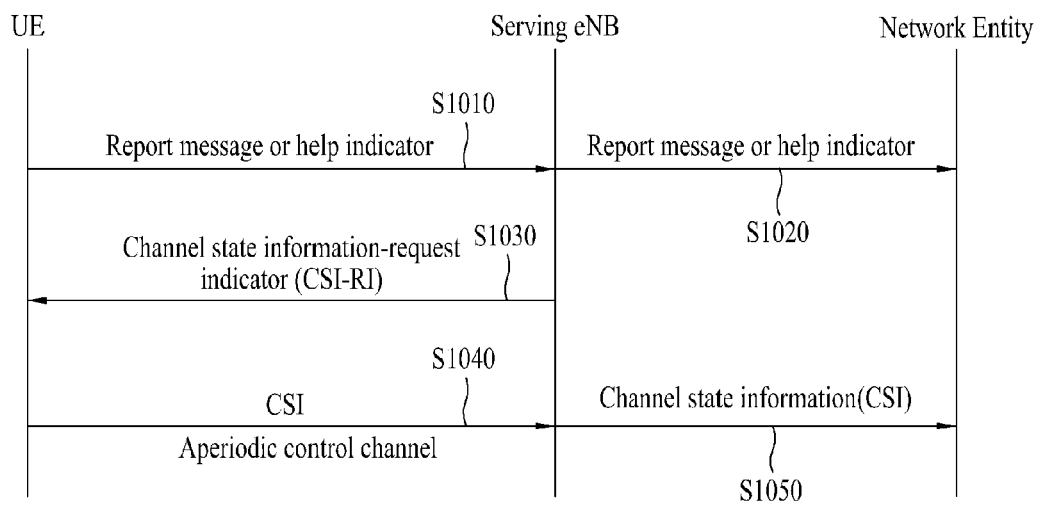
FIG. 10 is a diagram showing a process of, at a network entity, acquiring information necessary to select a CoMP scheme.

FIG. 10 is a diagram showing a process of acquiring information necessary to select a CoMP scheme at a network entity.

Referring to FIG. 10, a UE may transmit a message or help indicator indicating that the UE does not currently satisfy a minimum data rate requirement to a serving BS (S1010). The help indicator may include 1 bit or may include channel state information required for selecting a CoMP scheme. The network entity may receive a report message of the UE from the serving BS (S1020).

The serving BS may be event-triggered by the report message so as to transmit a channel state information-request indicator (CSI-RI) for requesting channel state information (CSI) to the UE (S1030). The serving BS may be a single BS or multiple BSs.

Thereafter, the UE may transmit the CSI to the serving BS through an aperiodic control channel when receiving the CSI-RI (S1040). In the case where the UE periodically transmits CSI to the serving BS, resources may be wasted by resource allocation for a large amount of channel state information. Thus, the CSI is preferably aperiodically transmitted.

The CSI transmitted from the UE to the serving BS may include an SINR of each CoMP set and each BS and CSI. The SINR matches a data rate in one-to-one correspondence and may be a criterion representing a data rate. The serving BS may transmit the CSI received from the UE to the network entity (S1050).

Thereafter, the network entity may adaptively select a CoMP scheme suiting a current situation.

As described above, although the embodiment in which three different CoMP schemes are used is described in the present invention, a method of selecting a CoMP scheme from among other CoMP schemes may be used.

Figure 11:
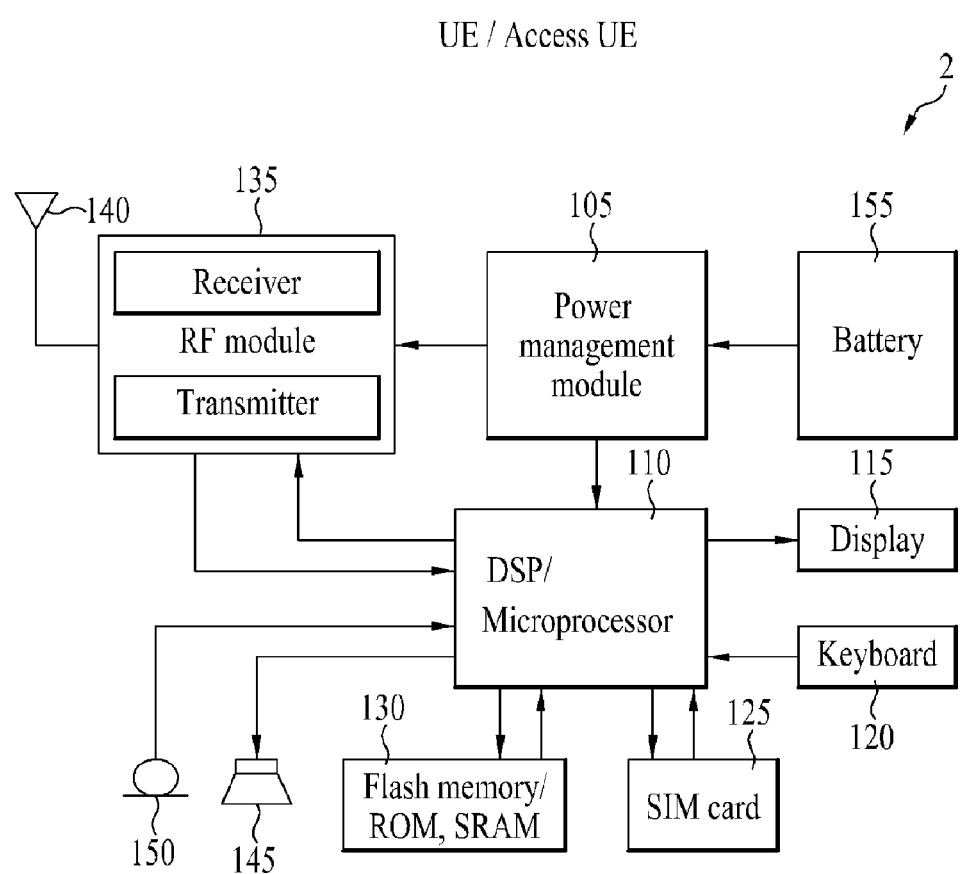
FIG. 11 is a block diagram showing an example of the structure of a UE or an access UE.

FIG. 11 is a block diagram showing an example of the structure of a UE or an access UE.

Referring to FIG. 11, the UE includes a processor (or a digital signal processor (DSP)) 110, an RF module 135, a power management module 105, an antenna 140, a battery 155, a display 115, a keypad 120, a memory 130, a subscriber identification module (SIM) card 125 (optional), a speaker 145 and a microphone 150.

A user inputs instruction information such as a telephone number by pressing a button of the keypad 120 or using the microphone 150. The microprocessor 110 receives and processes the instruction information and performs a suitable function such as telephone number dialing. The microprocessor may obtain operation data from the SIM card 125 or the memory 130 and perform the above function. The processor 110 may display the instruction and operation information on the display 115 for reference and convenience.

The processor 110 may send the instruction information to the RF module 135 and start communication such as transmission of a RF signal including voice communication data. The RF module 135 includes a receiver and transmitter for receiving and transmitting the RF signal. The antenna 140 facilitates transmission and reception of the RF signal. The RF module 135 may receive the RF signal, convert the RF signal into a baseband signal, and send the baseband signal to the processor 110.

The processed signal is, for example, converted into an audio signal output through the speaker 145 or readable information. The processor 110 includes protocols and functions necessary to perform the various processes described in the present specification.

The aforementioned embodiments are achieved by combination of structural elements and features of the present invention in a predetermined type. Each of the structural elements or features should be considered selectively unless specified separately. Each of the structural elements or features may be implemented without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments according to the present invention can be implemented by various means, for example, hardware, firmware, software, or a combination thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, procedure, or function, which performs functions or operations described above. Software code may be stored in a memory unit and then driven by a processor. The memory unit may be located inside or outside the processor to transmit and receive data to and from the processor through various well known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

Methods of performing handoff in each CoMP set according to the embodiments of the present invention are industrially applicable.

The invention claimed is

1. A method of performing handoff between coordinate multipoint (CoMP) sets at a user equipment (UE), in a CoMP cluster including a plurality of base stations (BSs), the method comprising:
   measuring a signal to interference plus noise ratio (SINR) value of each of the CoMP sets constituted by the combination of a plurality of base stations within the CoMP cluster;
   transmitting the SINR value of each of the CoMP sets to a first base station, which is a serving base station, through a pilot strength measurement message (PSMM); and
   receiving, from the first base station, a message which instructs handoff based on the transmitted SINR value.

2. The method of claim 1, further comprising:
   simultaneously receiving signals from base stations in a CoMP active point set corresponding to a CoMP set selected from among the CoMP sets by a base station control system.

3. The method of claim 1, further comprising:
   receiving data from a CoMP active point set configured one base station in a CoMP set selected from among the CoMP sets by a base station control system.

4. The method of claim 1, wherein the SINR value of each of the CoMP sets is measured while the UE operates using a joint processing scheme which can simultaneously receive signals from base stations in each of the CoMP sets.

5. The method of claim 4, wherein the SINR value is represented by a sum of SINR values of the received signals if the UE receives the same signal from the base stations in the CoMP set.

6. The method of claim 1, wherein the SINR value of each of the CoMP sets is measured while the UE operates using a coordinated scheduling/beamforming scheme which eliminates an interference signal from a specific base station among base stations in each of the CoMP sets.

7. The method of claim 1, wherein the CoMP cluster is reconstituted by the UE within a CoMP network cluster set constituted by a base station control system.

8. A method of supporting handoff between coordinate multipoint (CoMP) sets at a base station control system in a CoMP cluster including a plurality of base stations, the method comprising:
   receiving, from the user equipment (UE), a signal to interference plus noise ratio (SINR) value of each of the CoMP sets constituted by the combination of the plurality of base stations within the CoMP cluster; and
   determining a CoMP active point set based on a resource allocation state of each of the CoMP sets and the SINR value of each of the CoMP sets.

9. The method of claim 8, further comprising:
   selecting a CoMP coordinate point set based on the resource allocation state of each of the CoMP sets and the SINR of each of the CoMP sets.

10. The method of claim 8, wherein the selected CoMP active point set includes one base station.

* * * * *